US009156063B2

(12) United States Patent
Bowers et al.

(10) Patent No.: US 9,156,063 B2
(45) Date of Patent: Oct. 13, 2015

(54) METHOD AND SYSTEM FOR PRESORT BREAK SORTING OF MAILPIECES

(75) Inventors: Brian Bowers, Mundelein, IL (US); Steven Seburn, Buffalo Grove, IL (US)

(73) Assignee: Bell and Howell, LLC, Durham, NC (US)

(*) Notice: Subject to any disclaimer, the term of this patent is extended or adjusted under 35 U.S.C. 154(b) by 626 days.

(21) Appl. No.: 13/459,721

(22) Filed: Apr. 30, 2012

(65) Prior Publication Data

US 2012/0296467 A1 Nov. 22, 2012

Related U.S. Application Data

(60) Provisional application No. 61/480,070, filed on Apr. 28, 2011.

(51) Int. Cl.

| | |
|---|---|
| ***G06F 7/00*** | (2006.01) |
| ***B07C 1/00*** | (2006.01) |
| *B07C 1/02* | (2006.01) |
| *B07C 3/10* | (2006.01) |

(52) U.S. Cl.
CPC ... *B07C 1/00* (2013.01); *B07C 1/02* (2013.01); *B07C 3/10* (2013.01); *B07C 2201/00* (2013.01); *B07C 2301/00* (2013.01)

(58) Field of Classification Search
None
See application file for complete search history.

(56) References Cited

U.S. PATENT DOCUMENTS

| | | | | |
|---|---|---|---|---|
| 8,748,768 | B2 | 6/2014 | Bowers | |
| 2004/0030661 | A1 * | 2/2004 | Amato | 705/406 |
| 2011/0046775 | A1 * | 2/2011 | Bailey et al. | 700/224 |

* cited by examiner

*Primary Examiner* — Yolanda Cumbess
(74) *Attorney, Agent, or Firm* — Jenkins Wilson Taylor & Hunt, P.A.

(57) ABSTRACT

The present subject matter relates to techniques and equipment for processing mailpieces. The mailpieces have been manufacture on a mailpiece inserter or directly from a printer The manufactured mailpieces are processed on a mail sorter to produce trays of mail that are grouped by zone improvement program. The mailpieces are sorted without a predefined sort scheme loaded on the mail sorter.

27 Claims, 3 Drawing Sheets

METHOD AND SYSTEM FOR PRESORT BREAK SORTING OF MAILPIECES

RELATED APPLICATIONS

This application claims the benefit of U.S. Provisional Application No. 61/480,070 Filed Apr. 28, 2011 entitled "METHOD AND SYSTEM FOR ZIP BREAK SORT," the disclosure of which also is entirely incorporated herein by reference.

TECHNICAL FIELD

The present subject matter relates to techniques and equipment to process mailpieces that have been created on a mailpiece inserter or directly from a printer. The mailpieces are processed on a mail sorter to produce trays of mail that are grouped by ZIP® (zone improvement program). The presort groupings by tray qualify for postal authority discounts.

BACKGROUND

Large mail processing facilities, such as letter shops, captive shops and service bureaus use high speed inserters which run at up 22,000 mail pieces per hour. The mailpieces come out of the inserter onto a stacking belt. Individual trays are marked with an edge marker or the first or last mailpiece is offset on the stacker belt. An operator must identify the tray visually and sweep the mail from the stacker belt and place the mailpieces in a mail tray. Since a tray holds approximately 350 mailpieces, the operator will often need to make several sweeps to fill a tray. This process is slow and can introduce errors if the trays are not maintained accurately due to sweeping errors caused by missing the edge mark or disturbing the mail stacked on the belt. Disturbance of the stack can result in losing the offset mailpiece indication for the end or beginning of a tray. The operator is also required to insert the correct tray tag in each mail tray. The stacker belt provides some buffer for the operator but he must average at least a tray per minute. If the operator falls behind, the inserter may have to be stopped, which impacts throughput. A similar problem exits for high speed printers that produce mailpieces such as postcards or self mailers since the output must be correctly swept into trays.

There are significant penalties for not keeping the mailpieces in a tray group together. If mailpieces are in the wrong tray or an incorrect tag is placed on the tray, presort postage discounts maybe lost for the mailing. In addition, no verification is made to ensure that all of the mailpieces have been manufactured and put in the correct tray group. As a result the mailing documentation maybe incorrect and not represent the actual mailing to be provided to the postal authority.

The mail pieces from the inserter or printer can be run on a sorter provided there is a sorter with sufficient sort bins available to meet the presort requirements. Sort schemes to control the sortation process also need to be developed based on the jobs to be run. Generating sort schemes is a highly manual process based on experience or documentation defining the delivery points associated with the mailpieces in the job to be run. Also, depending on the sort scheme and mail makeup, a second pass through the sorter maybe required to meet presort rules for discounted postage.

Hence a need exists for a mail sorter that can process the mail that is manufactured by an inserter or printer. This sorter system sort the mailpieces without a predefined sort scheme and will correct any errors in the grouping of mail pieces in mail trays in accordance with presort groups. In addition, the sorter will verify that all of the mailpieces that were manufactured are accounted for and update the mailing documentation for any discrepancies. These operations can be performed at 40 to 50 thousand mailpieces per hour on a sorter. Another advantage for the sorting approach is throughput gains. The sorter requires a few minutes of setup between jobs since the sort scheme is setup automatically during sortation. Sweeping of the sorter bins is more efficient since fewer bins are used and they a grouped in one area to facilitate sweeping with minimum movement by the operator. One sorter can service multiple inserters or printers and ensure the job accuracy demanded by the postal authority and clients.

SUMMARY

It is desirable to provide a method and related system to process a plurality of mailpieces. The method includes acquiring mailpiece documentation data for the plurality of mailpieces manufactured on mailpiece production equipment such as, but not limited to an inserter or printer. The acquired mailpiece documentation data identifies the mailpieces in a presort break sequence order and indicates which mailpiece is assigned to a given tray. The plurality of mailpieces are sorted and tracked on the mailpiece sorter without a predefined sorting scheme. The mailpieces are sorted to one or more bins associated with a mailpiece tray grouping based on the acquired mailpiece documentation data. During the sorting step, a sorting scheme is dynamically generated and mailpieces are dynamically allocated to the one or more bins based on the tray assignment of each mailpiece entering the mailpiece sorter.

In certain examples, the teachings herein alleviate one or more of the above noted problems with a mailpiece sorter configured to process mailpieces from an inserter or printer that were manufactured in presort break order in accordance with postal authority presort rules. The sorter can process the trays of mail in any order and correct for any errors in the tray groups without the use of a pre defined sort scheme. The sorter can verify that all mailpieces are accounted for and documented correctly. The sorting documentation will meet the requirements of a manifest and the full service 1 Mb requirements of uniquely identifying every mailpiece in a tray. Alternately, the unique identifier maybe contained in an optical mark recognition (OMR), data matrix, sequence number or other unique identification format.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
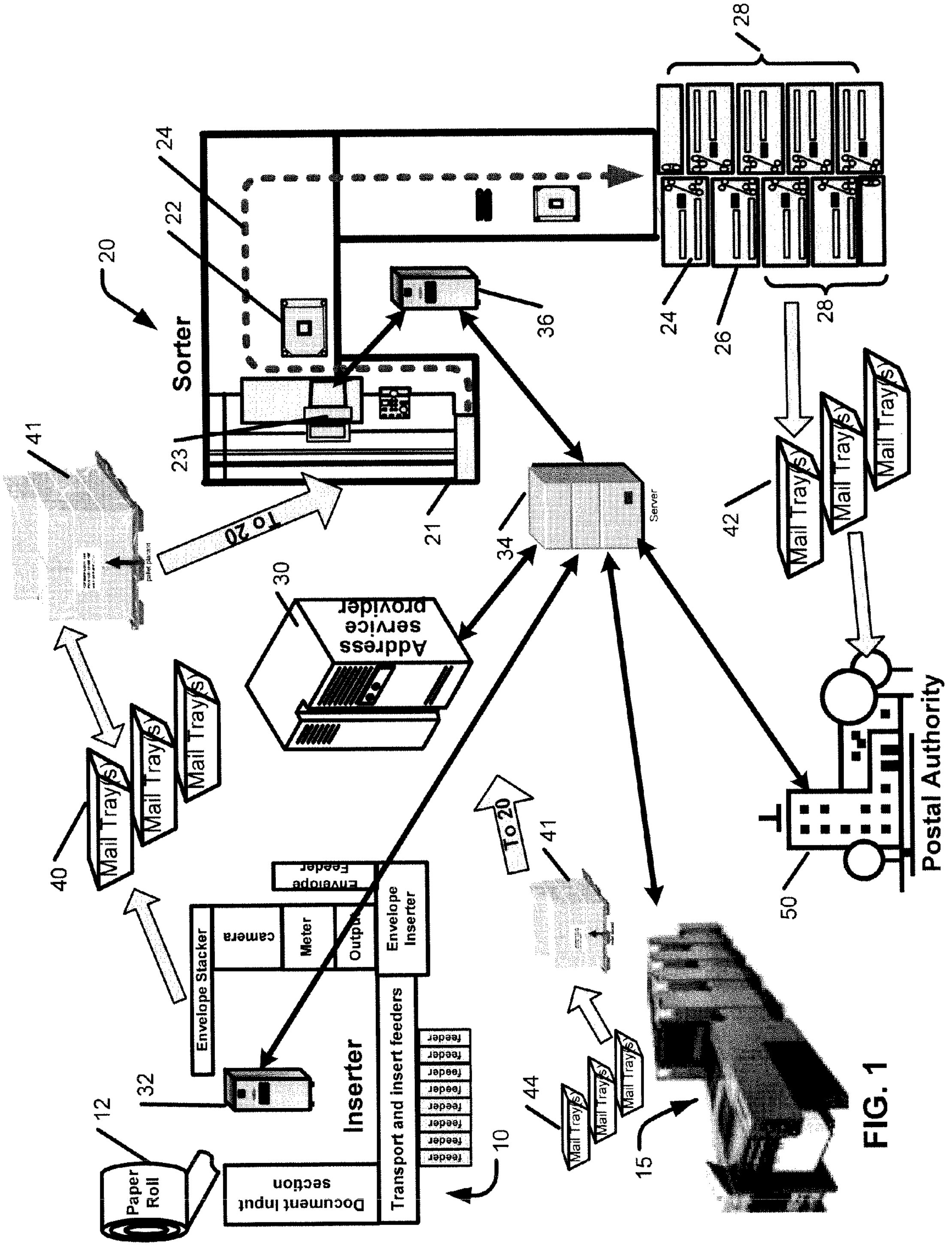
FIG. 1 is an illustration of the system required for presort break sorting

Reference now is made in detail to the examples illustrated in the accompanying drawings and discussed below. FIG. 1 illustrates the system requirements for presort break sorting. Mailpieces are produced on either an inserter 10 or on a printer 15. These mailpieces are produced in presort sequence order and grouped in presort order in accordance with postal authority requirements. The groupings are based on qualifying 5-digit groupings first followed by 3-digit, AADC and mixed-AADC groupings. The presort postage discounts are largest for qualifying 5-digit groupings progressing down to mixed-AADC which has the least discount. The address lists for the documents to be inserted are assembled into presort groups by the address service provider 30 and printed in presort groups on paper rolls 12 or other formats such as but not limited to fan folded pages. The inserter system 10 produces mailpieces that consist of an envelope with at least a one page document, with an address that is visible through the envelope window, plus inserts. The mailpieces from the inserter 10 are swept into trays 40 and stacked on pallets 41 for movement to the sorting system 20. The mailpieces from the printer 15 system are typically postcards or self mailers made from a single sheet that is bi-folder or tri-folded and tabbed. Other formats maybe chosen by those skilled in the art such as but not limited to wrapping machines. The individual mailpiece print file entries have been put in presort order based on the address data and presort rules. These mailpieces are put into mail trays 44 and generally stacked on pallets 41 for movement around the facility or between facilities. The staging depends on where the sorting systems are located. The mailpieces come off the inserter, printer or wrapper in presort groups starting with the 5-digit grouping and finishing with the mixed-AADC groupings. The order of production maybe altered based on the staging requirements and how the sorting system is to be run.

As an alternative, the mailpieces may be manufactured in other than presort tray groups, such as but not limited to, alphabetical or a combination of formats that result from combining several jobs together. Even though running jobs that are produced in presort tray group sequence run with significantly better efficiently, other configurations are supported. The control logic is the same for the alternate manufacturing options. However, many more trays will be open in sort bins thus requiring a much larger sorter. The address service provider 30 will produce mailing documentation which define presort tray groups and the presort qualification level and then assign individual mailpieces to tray groups based on the address delivery point and their unique ID for one or more print or inserting jobs. The resulting mail documentation represents the tray groups which will result after the sorting operation is complete. The sorter reads the unique ID and sorts the mailpiece to the correct sort bin for the open tray group or assigns a new bin for the mailpiece tray group. Errors are handled per steps S60, S70 and S85 in FIG. 2.

A system server 34 is connected to the inserter control computer 32 to provide control data for assembling the mailpieces. Similarly, the printer 10 receives print files and printer control data from the system server 34. The system server 34 contains the complete job characteristics for the mailpieces being produced. This data includes but is not limited to:

- All of the unique identifiers that are contained within the Intelligent Mail® barcode (IMb) or other symbology that provides a unique identification for each mailpiece in the job.
- Tray and the unique identifiers for each mailpiece expected to be in a given tray.
- Number of tray groups and mailpieces versus each level of presort group discount.

The job and mail characteristics data is transferred to the system server 34 when inserting or printing jobs are completed. The production jobs are allocated to the one or more sorters, as needed to run the presort sequence mail sorting. The production job and mail characteristics are transferred from the system server 34 to the sort computer 36 when a job is selected by the operator.

Once a sorter job has been selected, mailpieces from trays 40 or 44 are drawn from the pallet(s) 41 and placed on the feeder magazine 21. The sorter and feeder are started by the operator, using the control panel 23, and the mailpieces are processed in accordance with the FIG. 2. The imaging system 22 reads the unique identifier which is used by the sorter control processes 36 to control mailpiece sorting. Mailpieces with a unique identifier which do not correspond to any unique identifier associated with the job are sorted to the reject bin 24. Mailpieces that belong to the job, but can not be sorted to the required tray, are sorted to the out of scheme bin 26. This may occur when all bins are allocated to an open sort group and can not be used for new sort groups until a bin is swept. The first mailpiece in the new group will have to be rerun once a bin has been made available. Another example of out of scheme occurs when the unique identifier indicates that the mailpiece belongs to a tray that has been closed and swept. These out of scheme mailpieces will have to manually added to a correct tray and mailing data updated. Those skilled in the art may allocate other special purpose bins.

The balance of the bins 28 are used on a rotating basis to sort mailpieces into tray groups in accordance the presort groups defined by the address service provider 30. This dynamic allocation of sort bins to a sort group without using a predefined sort scheme is a feature unique to this disclosure. If the mailpieces are assigned a unique identifier, the data record for the job will identify which presort group the mailpiece, with this unique ID, belongs to and the sorter control will know if a bin 28 is currently collecting to that sort group. As a result, when the mailpiece delivery point and unique ID have been read by the reader 22 the mailpiece can be sorted to the correct bin for an open presort group or to an newly allocated bin. Furthermore, processing validation can be done by associating the unique ID for all mailpieces in the job to the presort group and tray they were sorted into. Any mailpieces that are not seen, based on the unique IDs for the job, are missing and the mailing documentation can be updated accordingly. All other mail sorters work from a per-defined sort scheme that was derived and loaded into the sorter computer before the sorting job is started. Since most of mailpieces for a tray will be in the same input tray, trays will be completed quickly since any missing mailpieces will be in adjacent input trays. Since trays are processed and completed quickly, bins maybe swept as soon as all expected mailpieces for that bin have been seen (based on reading the unique ID) and made available for reuse. Normally sorter bins are allocated by a sort scheme that assigns a presort group to a bin for the duration of the sorting job. This presort group dynamic bin allocation design requires fewer bins to run efficiently, avoids the need to create a first pass sort scheme, facilitates quick bin sweeping based in unique ID reading and provides positive validation that the mailpieces were sorted correctly and that the mailing documentation is correct.

Once the sorting job is complete, any bins with remaining mailpieces are swept into mail trays 42 for the finished job. If the tray validation is not complete and the bin sweep light is not on, mailpieces are missing from the tray. The missing unique identifiers are identified when the operator prints a tray tag for the bin. The mailing documentation is updated in the system server 34 with data provided by the sorter control processor 36. The system server 34 updates the mailing documentation that was received from the address service provider 30 for any discrepancies and transmits the mailing documentation to the postal authority 50 in an approved format such as but not limited to Mail.dat or Mail.xml. This electronic documentation identifies the mail tray by its own unique identifier and the mailpiece unique identifier of every mailpiece in the tray. Numerous other parameters are included in the electronic documentation as required by the postal authority. The completed mail trays 42 are put on a pallet and delivered to the postal authority 50.

Alternately, if unique identifiers are not on the mailpieces, dynamic sort bin allocation is still possible. The documentation from the inserter or printer will at least contain the mail makeup data. This documentation defines the presort groups and number of mailpieces in the presort group. When a delivery point ZIPcode is read by the reader 23, lookup of the 5 digit delivery point in the data record will define the presort group. If the presort group has an assigned bin, the mailpiece is sorted to that bin. If the bin is full, the next available bin will be used. Bin full will be determined by the hardware sensor since piece count is not accurate and there is no unique IDs available to checkoff. Identification of individual mailpieces per tray also is not possible, making a manifest mailing documentation not possible. However, the documentation available is sufficient to create the mailing documentation acceptable by the postal authority for sorter operations.

Figure 2:
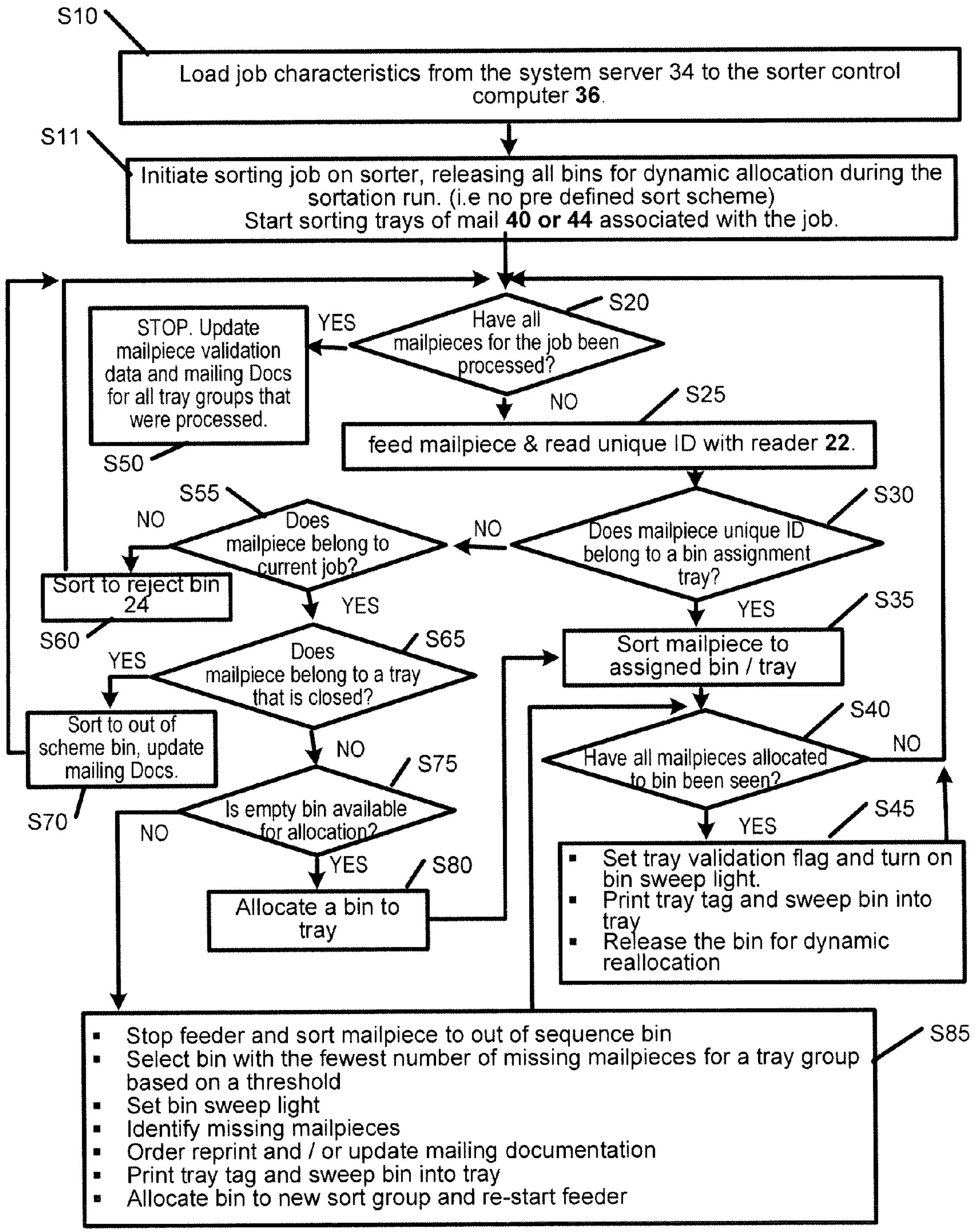
FIG. 2 is an exemplary process flow diagram of the sorter operations.

Turning now to FIG. 2 for an exemplary process flow diagram of the sorter operations. In step S10 the job characteristics are down loaded from the system server 34 to the sorter control computer 36. Numerous jobs may be down loaded, each of which corresponds to jobs that were run on the inserters 32, envelope wrappers or printers 15. In come cases jobs will be combined for more efficient running on the sorter 20. In step S11, the operator will select and initialize one of the sort jobs on the sorter. The initialization process erases any existing sort scheme that may have been preloaded or dynamically created during a previous sortation run. This step releases all sort bins for dynamic allocation during the upcoming sorting run, except for a few bins that are typically allocated to error conditions. The system server 34 will transfer the associated job and mailpiece characteristics to the sorter control computer 36. The job characteristics data record contains at least one of these characteristics:

- Number if mailpieces in the mailing (job)
- The unique identifier to be found in the 1 Mb, OMR, data matrix, sequence number or other symbology for each mailpiece
- Allocation of mailpiece unique identifiers to a tray
- Number of trays per presort break (i.e. a presort group)
- Any other characteristics from the electronic data file (Mail.dat, Mail.xml . . . ) that those skilled in the art may choose to utilize.

Sorting operation is initiated using the mail trays 40 and 44 from the job selected. Step S20 checks to see if all of the mailpieces in the job have been processed. Job completion is based on the observation of all unique identifiers associated with the job. If the operator has processed all of the mail trays, he may manually terminate the job. In this case all missing mailpieces will be added to an error report and the mailing documentation will be updated to reflect the missing mailpieces. If mailpieces are available S20, a mailpiece is fed from the feeder 21 and the 1 Mb is read to decode the unique identifier S25 using the reader 22. In step S30, the unique identifier is compared to the data record to determine if a bin has already been allocated for the tray to which the mailpiece belongs. If yes, the mail piece is sorted to the defined bin S35. In step S40, the decision to close the tray group bin to further mailpieces is made. This decision is based on the verification process which determines from the data record whether all of the expected mailpieces have been processed. If all of the mailpieces have been seen, control is returned to step S20 to continue processing. When all mailpieces for the tray have been processed S40, the tray verification flag is set indicating that the data record is verified for this tray S45. The bin sweep light is set to notify the operator that the mailpieces in the bin maybe swept into a mail tray 40 to be held for delivery to the postal authority 50 when the job is completed. The operator presses the tag print control causing the correct tray tag to be printed and to notify the control processor 36 that the bin 28 is available for dynamic assignment to another tray. The bin sweep light and the print tray tag control maybe indicators and buttons on the bin and/or displays and controls associated with the sorter control display and data entry 23 FIG. 1. Control is returned to step S20.

Returning to step S30, if the mailpiece unique ID, read by reader 22, does not belong to any current bin tray group assignment, control is transferred to step S55. In step S55, the data record is checked to determine if the mailpiece belongs to this current sorting job. If the mailpiece unique ID is not in the data record, it is sorted to the reject bin 24, S60. This can occur when an incorrect tray 40 or 44 is processed or a sweeping error occurred on the inserter, wrapper or printer. If the mailpiece belongs to the current job S55, the data record is checked to determine if the mailpiece belongs to a bin tray that is already closed S65. This is usually indicative of a sweeping error during mailpiece production. This mailpiece is sorted to the out of scheme bin 26, S70. The mailpieces in the out of scheme bin 26 will need to be manually handled and the associated data records updated. In both cases, after a mailpiece is sorted to the reject or out of scheme bins, processing continues uninterrupted with step S20. In the case where the mailpiece is not part of a closed tray S65, a bin needs to be assigned to the tray associated with the mailpieces being processed. If an empty bin 28 is available S75 it is allocated to the tray S80. The automatic allocation process S80 is set in advance, by those skilled in the art, to give priority to the human factors associated with operator bin sweeping factors. Control is returned to step S35 to sort the mailpiece to the allocated bin.

In the case where no bins 28 are available for allocation, a sequence of operations S85 is required to determine which bin to allocate in order for the sortation operation to proceed with minimum interruption. Due to production sweeping errors discussed above a bin may be held open due to only a few missing mailpieces. This bin can be reallocated by allowing the missing mailpieces to be sorted to the out of scheme bin and processed manually or identified as missing from the job. The following steps are executed:

1. Stop feeder and sort mailpiece to out of sequence bin 26. Several mailpieces may be diverted to the out of sequence bin since more than one mailpiece maybe in the sortation track 24 FIG. 1.
2. Select bin with the fewest number of missing mailpieces for a tray based on a threshold. The threshold maybe a few pieces or a percentage of the expected mailpieces. In either case the operator may override the threshold.
3. Set bin sweep light. The operator's display 23 may indicate the bins location to facilitate finding the bin and sweeping it.
4. Identify missing mailpieces. The data record associated with the tray is updated based on the missing mailpieces—i.e. unique identifiers not seen.
5. Order reprint and/or update mailing documentation
6. Print tray tag and sweep bin into tray. The process of printing a tray tag is also to indication that the bin has been swept. If pre-printed tray tags are used, a sweep indicator control is still required.
7. Allocate bin to new tray sort group and re-start feeder Control is returned to step S40. When all mailpieces have been processed S20 as determined by all unique IDs have been processed or there are no mailpieces left the sorter is stopped. In step S50 the sorter is stopped and validation reports are generated identifying all discrepancies. Mailing documentation is completed for submission of the mailing to the Postal Authority 50. This data may include but is not limited to a postage summary report, presort qualification report, Mail.dat, Mail.xml or any other report required by the client or postal authority. These reports and electronic files are generated in the system server 34 based on data provided by the sorter control computer 36. The data from the sorting operation is reconciled with the original data from the system server 34. Those skilled in the art may choose to configure the computers in alternate ways an allocate data processing in different configurations.

The operational process for presort break sorting of trays is as follows: The mailpieces are inserted or printed in presort groups. The presort groups based on sort to scheme tables based on the 5 digit depth of sort. Presort sequences that don't qualify to 5 digit are grouped to the 3 Digit or AADC as application levels. Mailpieces are printed or inserted based on these presort groups. As used herein, trays are mail containers roughly equal to a full bin of mailpieces. Other size mailpiece containers can be used with minor dynamic modification of the sort bin allocation. A tray group is a group of trays that are allocated to a presort group such as a 5-digit ZIP group. When all qualifying presort groups and the trays that make up the group are manufactured in a sequence, sort bins can be allocated S75/S80 and released S40/S45 for dynamic reallocation with the greatest efficiency. When importing a data set containing unique IDs per mailpiece, the presort group and tray break points are identified. If the 5 digit depth of sort doesn't qualify due to missing pieces or double feeds, the tray is flagged in a separate report as not qualifying and states discrepancy by mailpiece or tray. When presort validation is being performed, the missing mailpieces are reported. The setup screen 23 for the presort group break sort allows for the number of bins to be used in the sort process.

Bin 1 is the reject bin for pieces that can't be read or didn't read.

Bin 2 is the Out of Scheme bin and this is for pieces that were out of sequence or all bins were filled. No bins were available to sort to.

During sortation, when a bin is full, the system automatically shifts to the next bin and the full bin light goes on. The full bin light goes out once the bin is swept and the tray tag button is pushed. When there are no available bins, the sorter system stops feeding and the pieces go to the out of scheme bin. When the system detects that there is only one more available bin, the feeder stops feeding mail. This is to be done to virtually eliminate pieces going to the out of scheme bin which would require operator action and lost productivity. When all trays for a sort group are complete, the sorter system increments to the next presort group automatically. The bin light goes on for the final bin for the presort group and flashes indicating the presort group is complete.

The sorter system allows a mailing to be created either on its own or allows it to be combined with another mailing. If being combined with another mailing, the mailing is to be selected from a separate screen. All data for the multiple inserter or printer jobs are moved and combined into the mailing. Each presort group break mailing is considered a virtual sorter and each presort group break uses a separate bin presort designation. Presort group move reports are created based on the analysis of the documentation. The combined documentation is used in sorter control, validation, and postal authority documentation creation. The pieces going to the end bin are addressed as soon as possible during the sortation run to insure that they can be sorted to the appropriate bin. The sorter system verifies that the pieces are sorted to the bin. Therefore, the confirm to bin option is employed as part of this process.

As shown by the above discussion, functions relating pertain to the operation of presort break mailpiece sorting system wherein presort break sort is implemented in the hardware and controlled by one or more computers. The central data processor 30 is used to create the control data for the inserter or printer jobs. The central data processor 30 also creates an electronic data file which represents the characteristics of the mailpieces for the inserter or printer jobs. The control data is sent to the inserter control processor 32 or to the printer 15. The sorter control processor 36 receives sorting job data from the system server 34 for use in running the sorter and for creating final mailing documentation and validation reports. The sorter control processor(s) 36 receives data from the system server 34 which is needed for the running the sorting job. Results are reported back to the receiving module processor 34. The computer/processor/server architecture shown in FIG. 1 is a representative example that can be modified in numerous ways by those skilled in the art by combining functions into one processor and by choosing alternate hardware configurations. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer that functions as the control processor 170 and/or the associated terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for tracking of mail items through a postal authority network with reference to a specific mail target, in essentially the manner performed in the implementations discussed and illustrated herein.

Figure 3:
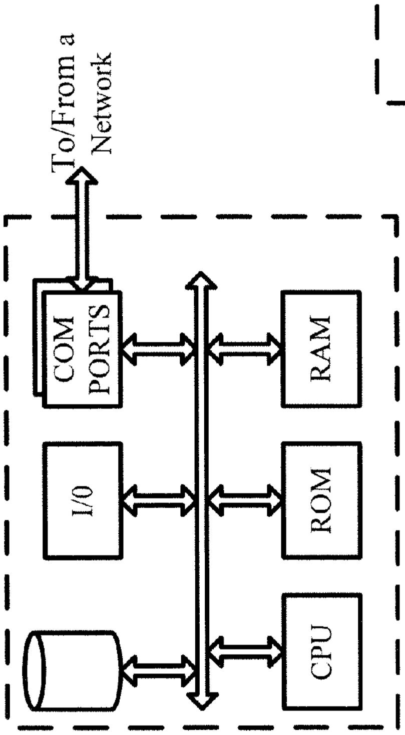
FIG. 3 illustrates a network or host computer platform, as may typically be used to implement a server.
Figure 4:
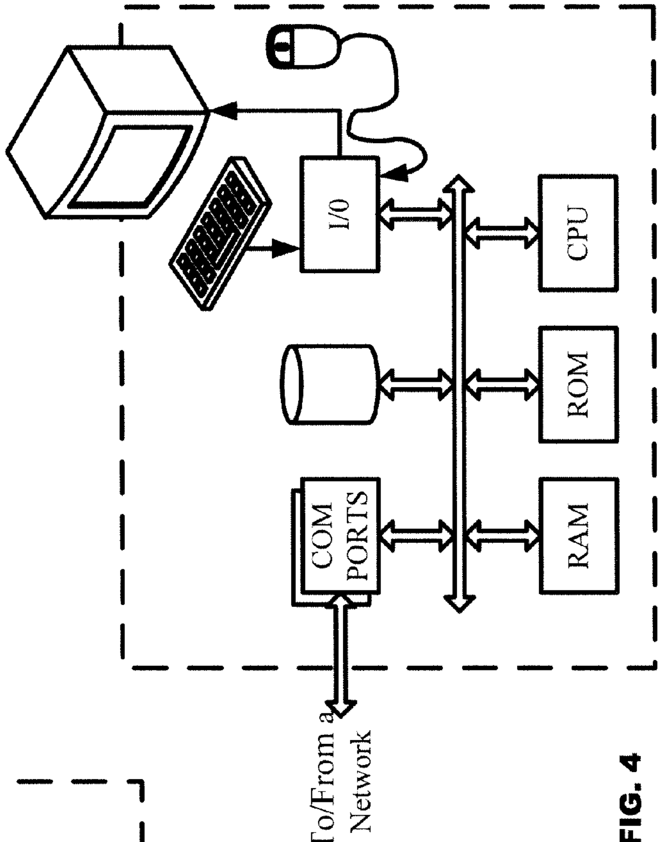
FIG. 4 depicts a computer with user interface elements, as may be used to implement a personal computer or other type of work station or terminal device.

FIGS. 3 and 4 provide functional block diagram illustrations of general purpose computer hardware platforms. FIG. 3 illustrates a network or host computer platform, as may typically be used to implement a server. FIG. 3 depicts a computer with user interface elements, as may be used to implement a personal computer or other type of work station or terminal device, although the computer of FIG. 3 may also act as a server if appropriately programmed. It is believed that those skilled in the art are familiar with the structure, programming and general operation of such computer equipment and, as a result, the drawings should be self-explanatory.

For example, control processor 160 may be a PC based implementation of a central control processing system like that of FIG. 3, or may be implemented on a platform configured as a central or host computer or server like that of FIG. 4. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for tracking of mail items through a postal authority network with reference to a specific mail target, as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art. The present examples are not limited to any one network or computing infrastructure model—i.e., peer-to-peer, client server, distributed, etc.

Hence aspects of the techniques discussed herein encompass hardware and programmed equipment for controlling the relevant document processing as well as software programming, for controlling the relevant functions. A software or program product, which may be referred to as a "program article of manufacture" may take the form of code or executable instructions for causing a computer or other programmable equipment to perform the relevant data processing steps, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform.

Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

In the detailed description above, numerous specific details are set forth by way of examples in order to provide a thorough understanding of the relevant teachings. However, it should be apparent to those skilled in the art that the present teachings may be practiced without such details. In other instances, well known methods, procedures, components, and software have been described at a relatively high-level, without detail, in order to avoid unnecessarily obscuring aspects of the present teachings.

What is claimed:

1. A method for processing a plurality of mailpieces, the method comprising steps of:

acquiring mailpiece documentation data for the plurality of mailpieces manufactured on mailpiece production equipment, wherein the acquired mailpiece documentation data identifies the mailpieces in a presort break sequence order and indicates which mailpiece is assigned to a given tray based a unique mailpiece ID printed on the mailpiece;

sorting and tracking the plurality of mailpieces on the mailpiece sorter without a predefined sorting scheme to one or more bins associated with a mailpiece tray grouping based on the acquired mailpiece documentation data;

during the sorting step, as mailpieces enter the sorter, dynamically generating a sort scheme by dynamically allocating the mailpieces that belong to the same mailpiece tray grouping to a bin;

dynamically adding the bin allocation and mailpiece tray grouping to the sort scheme; and adding an additional bin allocation and mailpiece tray grouping to the sort scheme when the mailpiece entering the sorter, based on the mailpiece unique ID and tray grouping association, belongs to a tray grouping that does not already exist in the dynamic sort scheme.

2. The method of claim 1, further comprising the step of generating updated mailpiece sorting documentation compliant with postal authority requirements such that individual mailpieces are uniquely identifiable.

3. The method of claim 1, wherein the mailpieces are manufactured in presort break sequence order, alphabetical order or a combination thereof.

4. The method of claim 1, further comprising the step of:

prior to the sorting step, releasing any previous sort bins assignments stored on a computer associated with the mailpiece sorter.

5. The method of claim 1, further comprising the step of determining whether one of the mailpieces is assigned to a tray that is full or closed.

6. The method of claim 5, wherein if it is determined that the one mailpiece is assigned to the tray that is full or closed, sorting the one mailpiece to an out of scheme bin.

7. The method of claim 5, wherein if it is determined that the one mailpiece is not assigned to a tray that is full or closed, determining whether an empty bin is available for allocation.

8. The method of claim 7, wherein if it is determined that no bin is available for the one mailpiece for allocation, a feeder of the mailpiece sorter is stopped and the one mailpiece is sorted to an out of sequence bin for further processing.

9. The method of claim 1, further comprising the step of:

upon confirmation that all mailpieces have been allocated to a bin, setting a tray validation flag and generating a bin sweep notification.

10. The method of claim 9, further comprising the steps of:

printing a tray tag and sweeping a bin into a tray; and releasing the swept bin for dynamic reallocation.

11. The method of claim 1, further comprising the step of dynamically re-allocating the one or more bins during the sorting step.

12. The method of claim 1, wherein the step of adding an additional bin allocation is repeated as necessary.

13. A system for processing a plurality of mailpieces, the system comprising:

a sorter configured to receive the plurality of mailpieces manufactured in presort break sequence order, alphabetical order or a combination thereof;

a processor, associated with the sorter, configured to perform steps of:

acquiring mailpiece documentation data for the plurality of mailpieces manufactured on mailpiece production equipment, wherein the acquired mailpiece documentation data identifies the mailpieces in a presort break sequence order and indicates which mailpiece is assigned to a given tray based on a unique mailpiece ID printed on the mailpiece;

sorting and tracking the plurality of mailpieces on the mailpiece sorter without a predefined sorting scheme to one or more bins associated with a mailpiece tray grouping based on the acquired mailpiece documentation data;

during the sorting step, as mailpieces enter the sorter, dynamically generating a sort scheme by dynamically allocating the mailpieces that belong to the same mailpiece tray grouping to a bin;

dynamically adding the bin allocation and mailpiece tray grouping to the sort scheme; and adding an additional bin allocation and mailpiece tray grouping to the sort scheme when the mailpiece entering the sorter, based on the mailpiece unique ID and tray grouping association, belongs to a tray grouping that does not already exist in the dynamic sort scheme.

14. The system of claim 13, wherein the processor is configured to generate updated mailpiece sorting documentation compliant with postal authority requirements such that individual mailpieces are uniquely identifiable.

15. The system of claim 13, wherein the processor is configured to release any previous sort bins assignments stored on a computer associated with the mailpiece sorter prior to the sorting step.

16. The system of claim 13, wherein the processor is configured to determine whether one of the mailpieces is assigned to a tray that is full or closed.

17. The system of claim 16, wherein if it is determined that the one mailpiece is assigned to the tray that is full or closed, sorting the one mailpiece to an out of scheme bin.

18. The system of claim 16, wherein if it is determined that the one mailpiece is not assigned to a tray that is full or closed, determining whether an empty bin is available for allocation.

19. The system of claim 18, wherein if it is determined that no bin is available for the one mailpiece for allocation, a feeder of the mailpiece sorter is stopped and the one mailpiece is sorted to an out of sequence bin for further processing.

20. The system of claim 13, wherein the processor is configured to set a tray validation flag and generate a bin sweep notification upon confirmation that all mailpieces have been allocated to a bin.

21. The system of claim 20, wherein the processor is configured to:

print a tray tag and sweeping a bin into a tray; and release the swept bin for dynamic reallocation.

22. The system of claim 13, further comprising the step of dynamically re-allocating the one or more bins during the sorting step.

23. The method of claim 13, wherein the step of adding an additional bin allocation is repeated as necessary.

24. A method for processing a plurality of mailpieces, the method comprising steps of:

acquiring mailpiece documentation data for the plurality of mailpieces manufactured on mailpiece production equipment, wherein the acquired mailpiece documentation data identifies the mailpieces in a presort break sequence order and indicates which mailpiece is assigned to a given tray;

sorting and tracking the plurality of mailpieces on the mailpiece sorter without a predefined sorting scheme to one or more bins associated with a mailpiece tray grouping based on the acquired mailpiece documentation data;

during the sorting step, dynamically generating a sorting scheme and dynamically allocating the mailpieces to the one or more bins based on the tray assignment of each mailpiece entering the mailpiece sorter; and upon confirmation that all mailpieces have been allocated to a bin, setting a tray validation flag and generating a bin sweep notification.

25. The method of claim 24, further comprising the steps of:

printing a tray tag and sweeping a bin into a tray; and releasing the swept bin for dynamic reallocation.

26. A system for processing a plurality of mailpieces, the system comprising:

a sorter configured to receive the plurality of mailpieces manufactured in presort break sequence order, alphabetical order or a combination thereof;

a processor, associated with the sorter, configured to perform steps of:

acquiring mailpiece documentation data for the plurality of mailpieces manufactured on mailpiece production equipment, wherein the acquired mailpiece documentation data identifies the mailpieces in a presort break sequence order and indicates which mailpiece is assigned to a given tray;

sorting and tracking the plurality of mailpieces on the mailpiece sorter without a predefined sorting scheme to one or more bins associated with a mailpiece tray grouping based on the acquired mailpiece documentation data;

during the sorting step, dynamically generating a sorting scheme and dynamically allocating the mailpieces to the one or more bins based on the tray assignment of each mailpiece entering the mailpiece sorter; and wherein the processor is configured to set a tray validation flag and generate a bin sweep notification upon confirmation that all mailpieces have been allocated to a bin.

27. The system of claim 26, wherein the processor is configured to:

print a tray tag and sweeping a bin into a tray; and release the swept bin for dynamic reallocation.

* * * * *